United States Patent [19]
Lucas et al.

[11] Patent Number: 5,699,719
[45] Date of Patent: Dec. 23, 1997

[54] THERMAL CARAFE BREWING DEVICE WITH BREW-THROUGH LID

[75] Inventors: Eric E. Lucas, Bedford Heights; Marc L. Vitantonio, S. Russell; Michael Miroewski, Seven Hills, all of Ohio

[73] Assignee: Healthometer, Inc., Bedford Hts., Ohio

[21] Appl. No.: 561,012

[22] Filed: Nov. 21, 1995

[51] Int. Cl.[6] ............................................. A47J 31/00
[52] U.S. Cl. ................................. 99/299; 99/305; 99/279; 215/13.1; 215/311
[58] Field of Search .......................... 99/279, 299, 300, 99/304, 305, 306, 307, 316, 317; 426/433; 215/307, 311, 13.1

[56] References Cited

U.S. PATENT DOCUMENTS

| | | |
|---|---|---|
| 1,907,770 | 5/1933 | Feagler et al. |
| 2,403,691 | 7/1946 | States ............................ 99/279 |
| 2,445,395 | 7/1948 | Greene ............................ 215/311 |
| 3,561,506 | 2/1971 | Johnson. |
| 4,184,603 | 1/1980 | Hamilton, Sr.. |
| 4,356,848 | 11/1982 | Spies. |
| 4,482,083 | 11/1984 | Beck. |
| 4,694,738 | 9/1987 | Tarozzi ............................ 99/279 |
| 4,833,978 | 5/1989 | Martone ............................ 99/299 |
| 4,924,922 | 5/1990 | Johnson. |
| 5,168,793 | 12/1992 | Padamsee ............................ 99/279 |
| 5,480,054 | 1/1996 | Midden. |

Primary Examiner—Reginald Alexander
Attorney, Agent, or Firm—Calfee, Halter & Griswold LLP

[57] ABSTRACT

A thermal carafe brewing device includes an automatic drip brewing machine and a thermal carafe having a brew-through lid which utilizes a pressure controlled valve in a liquid passageway through the lid to allow liquid to flow directly from a brewing basket through the lid and into the carafe. The pressure controlled valve prevents liquid and heat from flowing out of the carafe through the lid by liquid and/or gas pressure from inside the carafe which closes the valve.

29 Claims, 4 Drawing Sheets

THERMAL CARAFE BREWING DEVICE WITH BREW-THROUGH LID

FIELD OF THE INVENTION

The present invention pertains to brewed beverage preparation, containment and dispensing and, in particular, to automated brewing devices and thermally insulated carafes adapted for use in connection with automated brewing devices.

BACKGROUND OF THE INVENTION

Automatic drip brewing devices have been provided with thermally insulated carafes as the direct receptacles of brewed beverage. See for example U.S. Pat. No. 4,694,738. The use of thermally insulated carafes in this manner aids in retaining heat in the brewed beverage. However, the carafe must have an open passage in order to directly receive brewed beverage from the brewing device. Any open passage provides a direct escape route for thermal energy from the hot beverage. The greatest amount of heat loss is by steam vapors which evaporate through even the smallest opening.

Attempts have been made to provide mechanically controlled seals in passageways into a thermal carafe directly from an automatic drip brewing device. For example, U.S. Pat. No. 4,924,922 discloses a brew through lid for a coffee carafe which is opened to receive a flow from a coffee maker by mechanical pressure upon a spring-biased plunger assembly within the lid which moves a seal in the bottom of the lid into an open position. The successful function of this design is dependent upon proper mechanical engagement of and pressure on the plunger assembly of the lid with the underside of the brew basket, which may include a specific brew basket drip-stop assembly which must contact the lid. Other approaches use different types of mechanical valves which are displaced upon positioning of the carafe under the brew basket, or simply manually opened prior to placement of the carafe under the brew basket. These designs suffer from the need to mechanically displace the seal by contact with another part, and they do not provide uni-directional flow control.

SUMMARY OF THE PRESENT INVENTION

The present invention substantially improves upon the prior art by providing a thermal carafe brewing and dispensing device which has a brew-through lid which includes a liquid pressure controlled and activated valve to provide a unidirectional flow path into the carafe. In accordance with one aspect of the invention, a thermal carafe adapted for use in connection with an automatic drip brewing device includes a vessel with thermally insulated walls, and a throat for receiving an insulated brew-through lid, the brew-through lid having a fluid passageway through a cross-section of the lid and a uni-directional pressure controlled valve disposed in the fluid passageway to allow liquid to flow only from an exterior of the lid to an interior of the lid. The valve is operated (opened and closed) solely by liquid and/or gas pressure.

In accordance with another aspect of the invention, a uni-directional pressure controlled valve is disposed in isolation in a fluid passageway in a brew-through lid whereby no moving mechanical contact of the valve with any other component of a carafe or brewing device is necessary for the valve to move between opened and closed positions to allow liquid to enter a carafe carrying the lid. The valve is operative to prevent both flow of liquid out of the lid and thermal energy loss through the lid.

In accordance with another aspect of the invention, a brew-through lid for a thermal carafe includes a casing dimensioned for insertion in an opening of a thermal carafe, a liquid passageway through a cross-section of the lid, and a liquid pressure controlled valve disposed in the liquid passageway and operative to allow liquid to flow through the lid in only a single direction from the top of the lid to the bottom of the lid. In accordance with another aspect of the invention a thermal carafe having a brew-through lid with a liquid passageway having a pressure controlled valve is provided in combination with an automatic drip brewing machine whereby a brewed beverage is drained directly from a brewing basket into the thermal carafe through the liquid passageway of the lid and the pressure controlled valve prevents flow of liquid and thermal energy out of the carafe. In accordance with still another aspect of the invention, a novel brew-through thermal carafe lid having a liquid pressure operated uni-directional flow control valve is engageable with a stopper seal mechanism of a brewing basket of an automatic drip brewing device whereby flow from the brewing basket is controlled according to the presence of a receptacle such as a carafe with the brew-through lid under the brewing basket.

These and other aspects of the invention are herein described in particularized detail with reference to the accompanying Figures.

DETAILED DESCRIPTION OF PREFERRED AND ALTERNATE EMBODIMENTS

Figure 1:
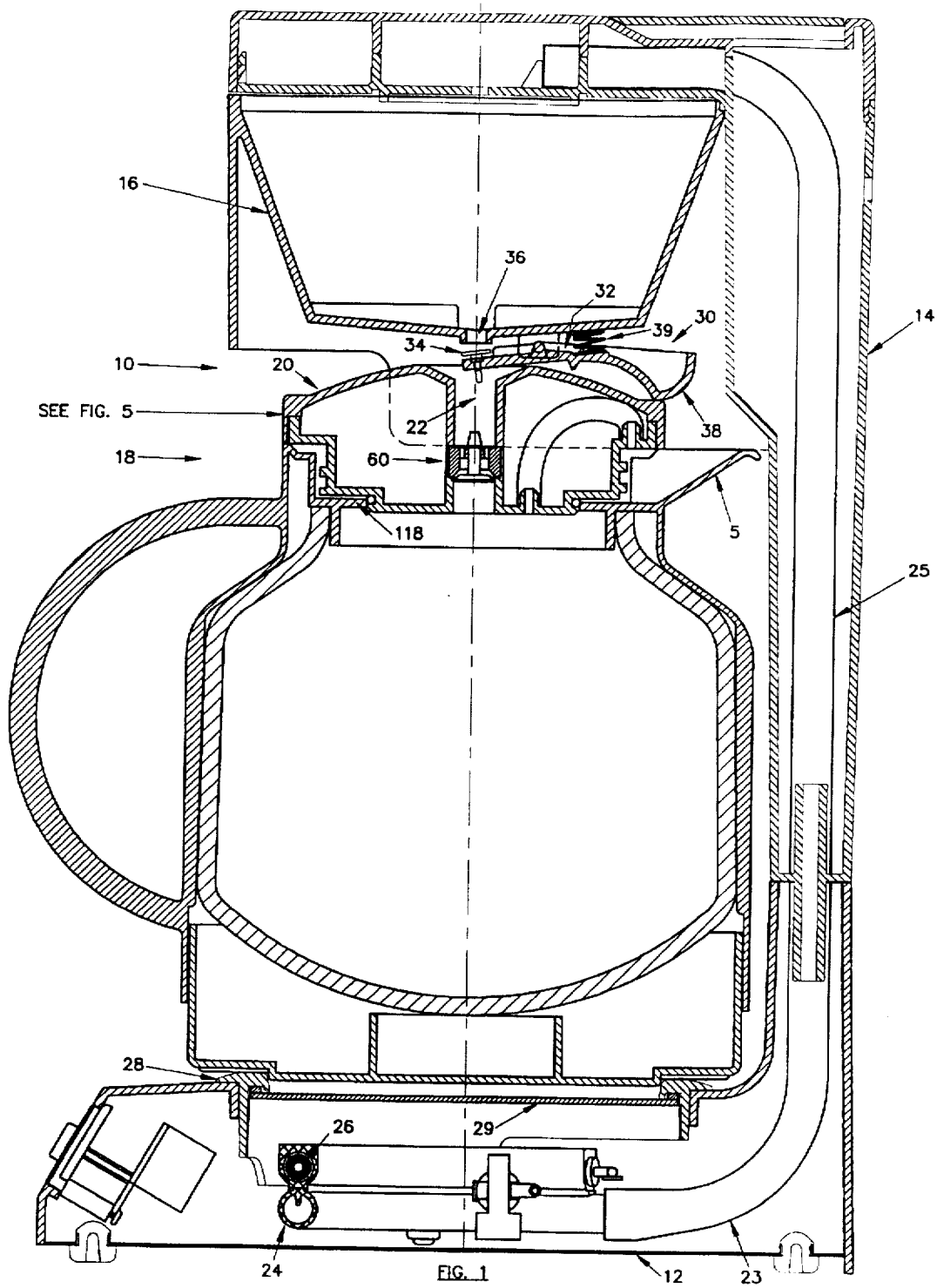
FIG. 1 is a cross-sectional side elevation of one embodiment of the thermal carafe brewing device of the present invention.

As shown in FIG. 1, the invention includes a thermal carafe brewing device, indicated generally at 10, which includes a base 12, a water reservoir and heated water distributor structure 14, a brewing basket 16, and a thermally insulated carafe 18. The carafe 18 serves as both an insulated direct receptacle for brewed beverage which drains from the brew basket and as a serving device. The carafe includes a brew-through lid 20 which, as described in great detail below, is provided with a pressure-controlled uni-directional valved liquid passageway 22 which allows brewed beverage to enter the carafe directly from the brew basket, retains substantially all of the thermal energy of a heated brewed beverage in the carafe, and prevents flow of liquid out of the carafe through the liquid passageway.

The base 12 of brewing device 10 houses an electrically powered water heating and pumping element 24 which receives brewing water from reservoir 14 through conduit 23, heats the water and pumps it by thermal expansion through conduit 25 to the top of heated water distributor structure for drainage or dispersion into brewing basket 16. Base 12 further includes a heater ring 28 dimensioned to support a perimeter of the flat bottom of carafe 18 above a platform 29. An insulative air gap is thereby provided between the bottom of the carafe and the top of platform 29. The water heating and pumping element 24 (including electric heating element 26) can be selectively distanced from the underside of platform 29 to prevent excessive heat transfer to platform 29 and carafe 18 for embodiments of the invention wherein the carafe is not intended to be externally heated. Brewing basket 16 is disengageable from heated water distributor structure 14, such as for example by slide out or hinged mounting of the basket or of an outer basket, to provide access to the interior of the basket for insertion and removal of brewing material such as coffee or tea and filters.

As further shown in FIG. 1, the bottom of brewing basket 16 may be provided with a biased stopper assembly, indicated generally at 30, to control flow of liquid from the brewing basket dependent upon the presence of a receptacle underneath the basket. In this embodiment, the stopper assembly 30 includes a single piece control arm 32 pivotally mounted to the underside of the brewing basket and biased to hold at one end a stopper seal 34 firmly against a drain hole 36 of basket 16. A cam 38 is provided at an opposite end of control arm 32 and positioned for pivotal displacement upon contact with an edge or top surface of brew-through lid 20, to thereby move stopper seal out of contact with drain hole 36. Upon removal of carafe 18 the stopper is biased by a spring 39 back against drain hole 36 to prevent flow from brewing basket 16.

Figure 2:
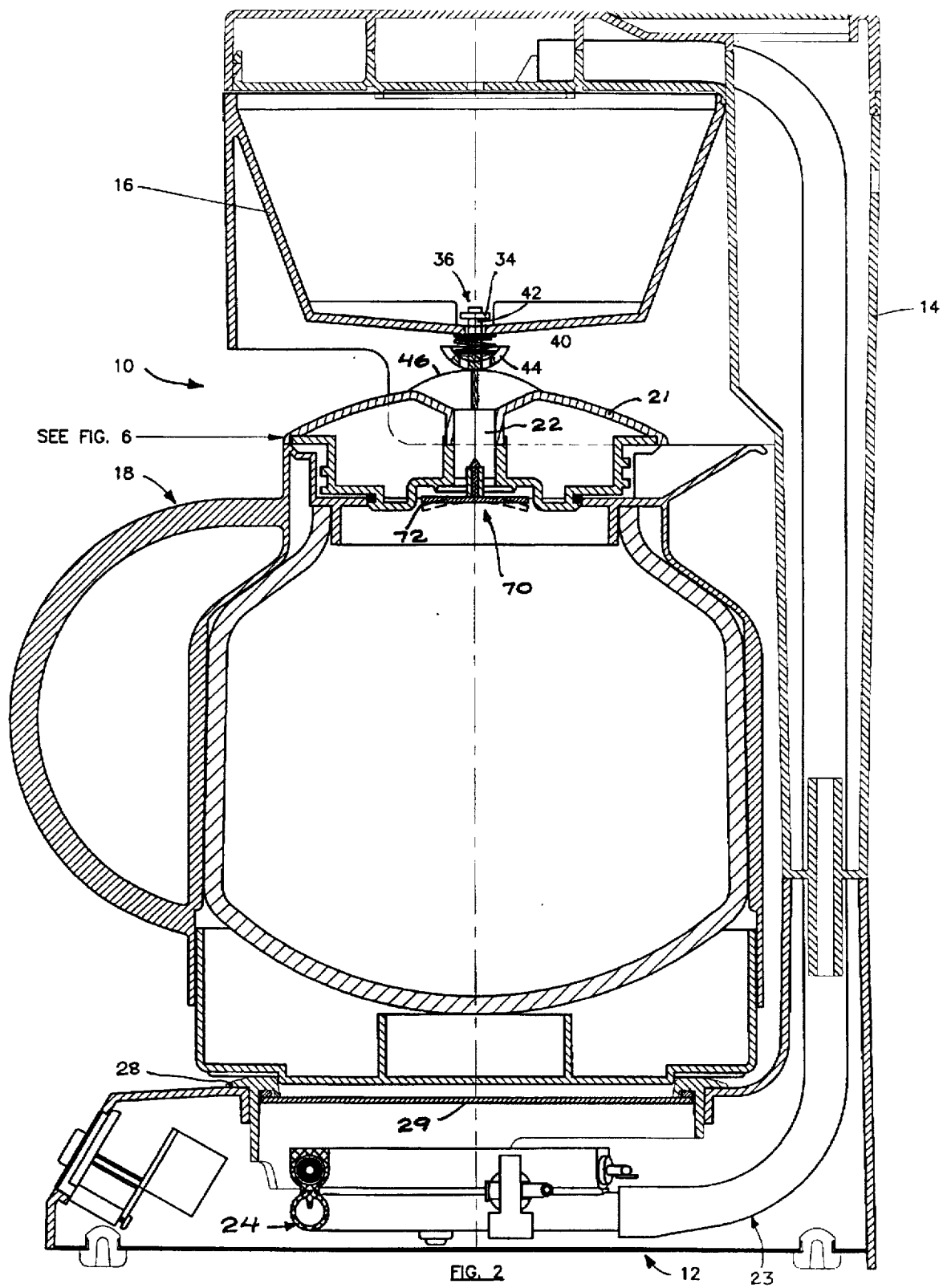
FIG. 2 is a cross-sectional side elevation of an alternate embodiment of the thermal carafe brewing device of the present invention.

FIG. 2 illustrates an alternate embodiment of the invention wherein the brewing basket stopper assembly 30 is in the form of a spring-biased plunger 40 having a shaft 42 to support a stopper seal 34 on an interior side of drain hole 36 and a slotted or perforated cammed plunger head 44 positioned for displaceable contact with a domed protrusion 46 of brew-through lid 20. Protrusion 46 may be in the form for example of arcuate vanes which span the liquid passageway 22 in the brew-through lid.

Figure 3:
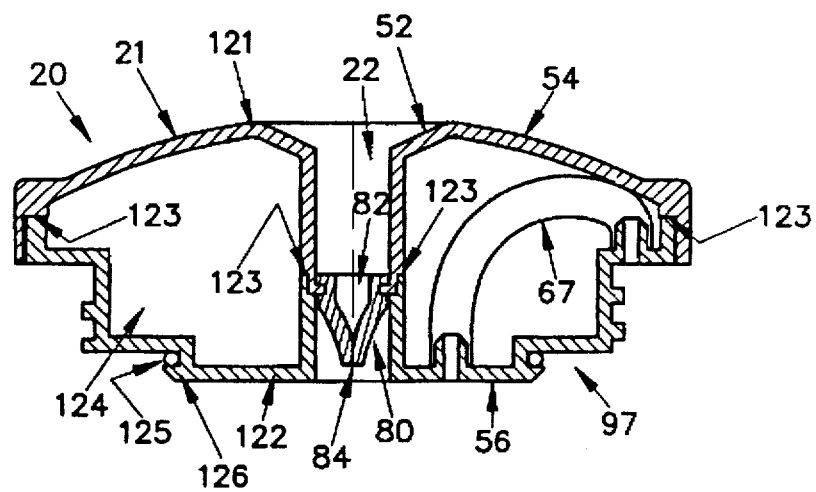
FIG. 3 is a cross-sectional view of an alternate embodiment of the brew-through lid of the present invention.
Figure 5:
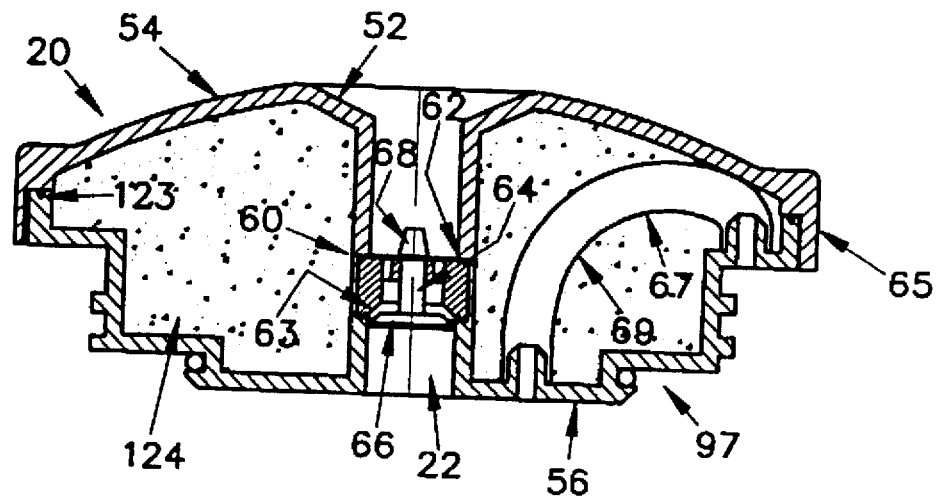
FIG. 5 is an enlarged cross-sectional view of the brew-through lid of the thermal carafe brewing device of FIG. 1.

As shown in FIG. 3, the brew-through lid 20 of the invention has a casing 21 and a liquid passageway 22 through a cross section of the lid. The casing may be formed by joinder of a cap 121 and a base 122 at points 123 by, for example, ultrasonic welding or other bonding processes suitable for achieving an air-tight seal. As shown in FIG. 5, the internal cavity 124 of lid 20 may be filled with foam or other insulative material to further enhance the insulative properties of the lid. The size of the liquid passageway is dimensioned to receive and direct a flow of liquid (in the form of a brewed beverage or simply hot water) from the drain hole 36 of brewing basket 16. In a preferred embodiment, the liquid passageway is simply a conduit of a minimum cross-sectional size sufficient to accommodate the maximum flow possible from the brewing basket. The periphery 52 of the opening to passageway 22 in the top 54 of lid 20 may be tapered to catch and funnel liquid which does not flow directly into the passageway. Fluid passageway 22 terminates at or near the bottom 56 of lid 20. A resilient seal 125 is provided about a perimetric flange 126 at lid bottom 56 for sealing contact with a carafe throat flange 118 with the lid fully engaged, as shown in FIG. 1.

As further shown in FIG. 1 and in enlarged detail in FIG. 5, a pressure controlled valve 60 is disposed in the liquid passageway 22 and oriented to allow flow of liquid only in a direction from the lid top 54 to the lid bottom 56. Valve 60 is referred to herein as a "check valve" and is just one of many different types of valves which can be incorporated into the liquid passageway or otherwise oriented to control flow of liquid and gas through the liquid passageway. Valve 60 includes an open housing 62 which has a valve seat 63 and vertically supports a shaft 64 having a sealing disk 66 at one end and a check stop 68 at an opposite end. With the shaft 64 free to vertical displacement, when upright the sealing disk defaults by gravity to an open position with the check stop resting upon the top of the housing 62. Liquid pressure upon the sealing disk, such as could occur with a liquid containing carafe in a non-upright orientation, moves the sealing disk into a closed position against valve seat 63. In this embodiment, an aeration vent 67 is provided in the form of a tube 69 which extends from the bottom of lid 20 to an underside of a lid lip 65 which interfaces with an air gap in the throat of the carafe vented principally through the pouring spout S.

Figure 6:
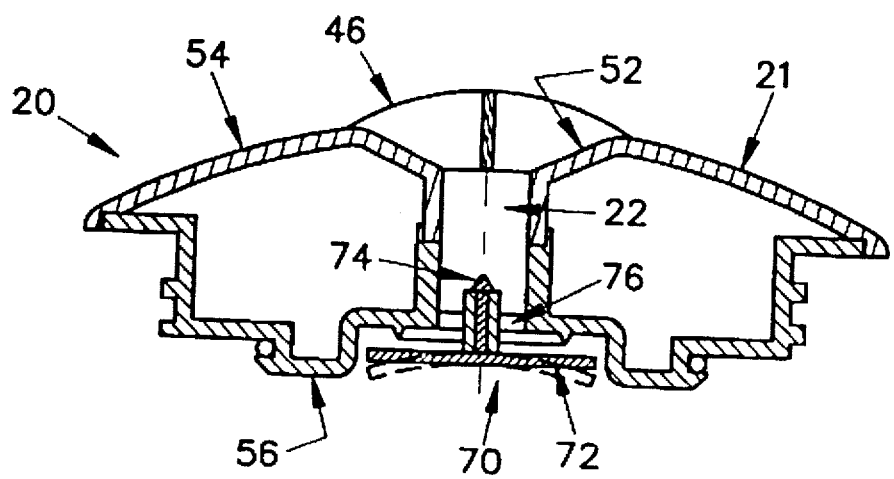
FIG. 6 is an enlarged cross-sectional view of the brew-through lid of the thermal carafe brewing device of FIG. 2.

In the embodiment of FIG. 2 (with the lid 20 shown in enlarged detail in FIG. 6) a flexible valve 70 having an elastomeric flap or disk-type seal 72 is positioned in liquid passageway 22 by attachment to a stem 74 engaged in a apertured support structure 76 which spans the cross-section of the liquid passageway. The valve 70 is preferably positioned toward or at the bottom of the liquid passageway to allow a liquid pressure head of sufficient force to accumulate upstream to open the valve. However, in each of the described embodiments and equivalents, the valve can be located either in the liquid passageway or at the openings to the liquid passageway at the top or bottom of the lid. In this application, the phrase "pressure controlled valve in the liquid passageway" means any of the described valves and equivalents positioned anywhere in the flow path of the liquid passageway. Stem 74 is of sufficient length to position seal 72 in a default open position relative to a sealing surface of support structure 76. In a function similar to valve 60, seal 70 is forced into a closed position by liquid pressure from within the carafe to occlude the liquid passageway. In this embodiment, an air path about valve 70 of dimensions greater than those of, for example, valve 60 allows elimination of a separate aeration provision such as vent 67 in FIG. 1. As liquid flows downward from the top of the lid to the bottom through passageway 22, seal 72 deflects to the configuration shown in phantom which further increases venting capacity.

FIG. 3 illustrates an alternate embodiment of the novel combination of a pressure controlled valve in a brew-through lid which utilizes a flexible (elastomeric) duck bill valve 80 disposed in the liquid passageway. Valve 80 has a generally cylindrical entry port 82 which tapers to a generally linear exit slit 84 which parts to allow flow upon accumulation of liquid pressure in the valve cavity. Steam pressure about exit slit 84 can cause the slit to close which provides a further advantage over the previously described embodiments by providing complete occlusion of the liquid passageway (and consequent retention of vapors) by gas pressure and without liquid pressure upon the valve from the interior of the carafe. As shown, vent 67 may be provided in this embodiment.

Figure 4:
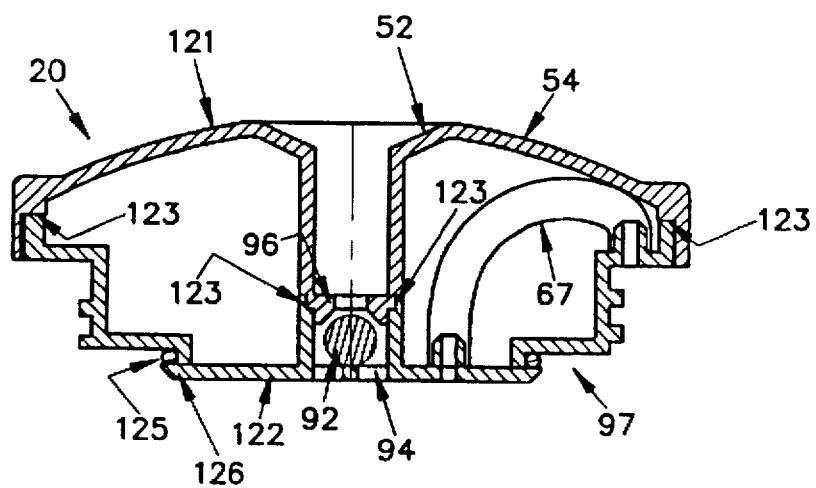
FIG. 4 is a cross-sectional view of an alternate embodiment of the brew-through lid of the present invention.

FIG. 4 illustrates an additional alternate embodiment of a brew-through lid liquid pressure-controlled valving arrangement which utilizes a ball valve 90 having a ball 92 housed in an open cage 94 or other flow-through structure in the liquid passageway. An upper cross member 96 of cage 94 is tapered to tightly receive ball 92 when it rolls against member 96 by the force of liquid inside the carafe against the bottom of the lid. This embodiment may or may not include aeration vent 67.

The invention thus novelly provides a thermal carafe brewing and dispensing device which automatically fills an insulated carafe with a hot brewed beverage whereupon thermal energy of the brewed beverage is effectively contained in the carafe and liquid flow prevented without any manipulation or mechanical adjustment of the valve in the lid of the carafe. The described valves in brew-through lids are self-operative and therefore do not require contact with any mechanical element of the carafe or brewing device or operator in order to effectively seal the carafe with the lid tightly in place. As used herein, the term "pressure controlled valve" means that the described valves are moved between opened and closed positions by pressure of liquid and/or gas, and not by moving mechanical contact with any part or component, or by manipulation. Further in accordance with the basic principle of the invention of using a uni-directional pressure controlled valve in a vessel lid, the liquid passageway and valve can be oriented in any direction in which flow is desired. For example, to enable flow out of a carafe the described valves could simply be inverted in the liquid passageway to provide a serving-type lid. Such a lid would be in a completely closed position until pressure of liquid from inside the carafe opened the valve.

Although the invention has been described with respect to certain preferred and alternate embodiments, equivalent structures and manners of operation which are within the scope of the invention may occur to those of ordinary skill in the art.

What is claimed is:

1. A thermally insulated brewing device comprising a thermal carafe adapted to receive and dispense brewed beverage and dimensioned to be arrangeable with an automatic drip brewing structure, the automatic drip brewing structure having a base for receiving the thermal carafe, a water reservoir for holding brewing water, a heated water distributor structure and brewing basket, a heating and pumping element for heating water from the water reservoir and pumping heated water to the heated water distributor structure, the thermal carafe having an internal cavity for receiving brewed beverage, insulated walls and an insulated lid; the insulated lid having a liquid passageway through which brewed beverage enters the carafe, the lid further comprising a pressure controlled valve in association with the liquid passageway operative to allow brewed beverage to flow into the carafe through the liquid passageway and to prevent liquid from exiting the carafe through the liquid passageway.

2. The brewing device of claim 1 wherein the pressure controlled valve in the liquid passageway of the insulated lid is a check valve.

3. The brewing device of claim 1 wherein the pressure controlled valve is a flexible member.

4. The brewing device of claim 1 wherein the pressure controlled valve is a duck bill valve.

5. The brewing device of claim 1 wherein the pressure controlled valve is a ball valve.

6. The brewing device of claim 1 wherein the insulated lid further comprises an aeration vent which provides an air passageway from a bottom of the lid to an air space about the lid when the lid is on the carafe.

7. The brewing device of claim 1 further comprising a flow control mechanism on the brewing basket contactable by the insulated lid.

8. The brewing device of claim 1 wherein the base for receiving the thermal carafe includes a heater ring which supports the carafe over a platform to provide an insulative air gap under the carafe.

9. The brewing device of claim 1 wherein the insulated lid is comprised of a cap bonded to a base.

10. A thermal carafe adapted for use with a brewed beverage device as a receptacle and serving container for a brewed beverage, the thermal carafe comprising an insulated vessel for receiving and containing liquid, a throat which includes a pouring spout, a brew-through lid insertable into the throat and having a liquid passageway through a cross-section of the lid, and a pressure-controlled valve in the liquid passageway.

11. The thermal carafe of claim 10 wherein the brew-through lid is comprised of a cap and a base sealed together to form a lid casing and the liquid passageway and a sealed cavity surrounding the liquid passageway.

12. The thermal carafe of claim 10 wherein the pressure controlled valve in the liquid passageway is a check valve.

13. The thermal carafe of claim 10 wherein the valve in the liquid passageway is a flexible member.

14. The thermal carafe of claim 10 wherein the valve in the liquid passageway is a duck bill valve.

15. The thermal carafe of claim 10 wherein the valve in the liquid passageway comprises a ball valve.

16. The thermal carafe of claim 10 wherein the brew-through lid further comprises a vent from a bottom of the lid to an area of the lid exposed to air when the lid is inserted in the throat on the carafe.

17. The thermal carafe of claim 11 further comprising insulative material in the sealed cavity of the lid.

18. The thermal carafe of claim 10 furhter comprising a lid seal contactable with a throat flange.

19. The thermal carafe of claim 10 wherein the pressure-controlled valve is disposed near the bottom of the lid.

20. A flow control device adapted for use as a lid for a liquid vessel, the flow control device comprising a casing formed of a cap joined to a base, the cap and base forming a liquid passageway through the casing, and a pressure control valve in the liquid passageway wherein the pressure controlled valve is a ball valve.

21. The flow control device of claim 20 wherein the pressure controlled valve is a check valve.

22. The flow control device of claim 20 wherein the pressure controlled valve is a flexible valve.

23. The flow control device of claim 20 wherein the pressure controlled valve is a duck bill valve.

24. The flow control device of claim 20 wherein an outer surface of the casing is contoured to contact a piece of an automatic drip brewing apparatus operative to control drainage of liquid.

25. The flow control device of claim 20 wherein the cap and base are joined at two different points.

26. The flow control device of claim 20 wherein a top opening of the liquid passageway is tapered.

27. The flow control device of claim 20 wherein the pressure controlled valve is located at an end of the liquid passageway.

28. The flow control device of claim 20 further comprising a vent operative to release air from a vessel on which the lid is placed as the vessel is filled with liquid.

29. The flow control device of claim 20 wherein the pressure controlled valve is oriented in the liquid passageway to allow flow of liquid from a top of the lid to a bottom of the lid.

* * * * *